Patented Aug. 31, 1926.

1,597,881

UNITED STATES PATENT OFFICE.

JAMES GUIDOS, OF JAMESTOWN, NEW YORK.

HAIR TONIC.

No Drawing.   Application filed November 28, 1924. Serial No. 752,809.

This invention relates to an improvement in a hair tonic, and more particularly in a tonic for inducing the growth of the hair, stopping the falling out of the hair and eliminating dandruff.

One ingredient of the medicine made in accordance with this invention is comminuted bone made by grinding the green bones of calves or other immature animals, the ground bone being then dissolved in a solution of alcohol and water.

This medicine is made by preparing a solution of approximately seventy-two per cent of alcohol and twenty-eight percent of water, to which is added the juice of garlic in desired amount, and dissolving in this mixture ground bone made from the green bones of calves or other immature animals, in the proportion of one pound of the ground bone to one gallon of the solution. The mixture is allowed to stand about twenty-four hours, when the undissolved particles of the ground bone are then removed by filtration. The application of this hair tonic to the scalp has been found to be very effective not only in stimulating the growth of the hair, but also in stopping the hair from falling out, and eliminating dandruff.

The quantity of ground bone added to the solution determines the strength of the hair tonic, and while the proportion of one pound of ground bone to one gallon of solution has proven to be most satisfactory in the usual case, the amount of ground bone may be increased or diminished if desired without departing from the spirit and scope of the invention as set forth in the following claims.

Having thus set forth my invention what I claim as new and for which I desire protection by Letters Patent is:

1. The process of making a hair tonic consisting in preparing an aqueous alcoholic solution, adding to said solution the juice of garlic and comminuted bones, made from the green bones of young animals, allowing the mixture to stand until the soluble particles have become dissolved and then removing the insoluble particles by filtration.

2. A composition for a hair tonic consisting of an aqueous alcoholic solution and comminuted bones made from the green bones of young animals, the soluble particles of the comminuted bones being dissolved in the solution and the insoluble particles being removed by filtration.

In testimony whereof I have affixed my signature.

JAMES GUIDOS.